US00RE48518E

(19) United States
(12) Reissued Patent
Kim et al.

(10) Patent Number: US RE48,518 E
(45) Date of Reissued Patent: Apr. 13, 2021

(54) WIRELESS CHARGING APPARATUS AND PORTABLE TERMINAL INCLUDING THE SAME

(71) Applicant: Samsung Electronics Co., Ltd., Gyeonggi-do (KR)

(72) Inventors: Ki-Hyun Kim, Gyeonggi-do (KR); Kil-Soo Ko, Gyeonggi-do (KR); Sung-Kweon Park, Gyeonggi-do (KR)

(73) Assignee: Samsung Electronics Co., Ltd

(21) Appl. No.: 15/970,394

(22) Filed: May 3, 2018

Related U.S. Patent Documents

Reissue of:
(64) Patent No.: 9,614,390
Issued: Apr. 4, 2017
Appl. No.: 13/931,100
Filed: Jun. 28, 2013

(30) Foreign Application Priority Data

Jun. 28, 2012 (KR) ..... 10-2012-0070242

(51) Int. Cl.
*H02J 50/12* (2016.01)
*H02J 50/70* (2016.01)
*H02J 7/00* (2006.01)
*H02J 50/10* (2016.01)

(52) U.S. Cl.
CPC ..... *H02J 50/12* (2016.02); *H02J 7/0042* (2013.01); *H02J 50/70* (2016.02); *H02J 50/10* (2016.02)

(58) Field of Classification Search
CPC ..... H02J 50/12; H02J 7/0042; H02J 17/00; H02J 7/025; H02J 50/90; H01F 38/14
USPC ..... 320/106, 108, 115; 307/104
See application file for complete search history.

(56) References Cited

U.S. PATENT DOCUMENTS

2006/0091290 A1* 5/2006 Yoshihara ..... H01L 27/14618 250/208.1
2008/0197956 A1* 8/2008 Hasegawa et al. ..... 336/61
2008/0245851 A1 10/2008 Kowalski
2009/0015197 A1 1/2009 Sogabe et al.
2009/0021212 A1* 1/2009 Hasegawa et al. ..... H01F 27/2871 320/108
2010/0197533 A1 8/2010 Kendall et al.
(Continued)

FOREIGN PATENT DOCUMENTS

EP 1 962 305 8/2008
JP 2007-128977 5/2007
(Continued)

OTHER PUBLICATIONS

Korean Office Action dated Dec. 13, 2017 issued in counterpart application No. 10-2012-0070242, 12 pages.
(Continued)

*Primary Examiner* — Kenneth Whittington
(74) *Attorney, Agent, or Firm* — The Farrell Law Firm, P.C.

(57) ABSTRACT

A wireless charging apparatus provided in an electronic device is provided. The wireless charging apparatus includes a charging resonance unit for wireless charging; a driving circuit unit to which the charging resonance unit is connected and to which an internal circuitry is mounted; a shield member mounted to a rear surface of the charging resonance unit; and a heat dispersion member mounted to the driving circuit unit and the shield member to disperse heat generated by the driving circuit unit.

13 Claims, 5 Drawing Sheets

(56) References Cited

U.S. PATENT DOCUMENTS

| | | | |
|---|---|---|---|
| 2011/0056215 | A1 | 3/2011 | Ham et al. |
| 2011/0070459 | A1 | 3/2011 | Kim |
| 2011/0194259 | A1 | 8/2011 | Goriaux et al. |

FOREIGN PATENT DOCUMENTS

| | | |
|---|---|---|
| JP | 2009-223881 | 10/2009 |
| KR | 1020080032519 | 4/2008 |
| KR | 1020090126323 | 12/2009 |
| KR | 1020120006885 | 1/2012 |
| KR | 10-1121481 | 2/2012 |
| WO | WO2008044875 | 4/2008 |

OTHER PUBLICATIONS

European Search Report dated Sep. 3, 2019 issued in counterpart application No. 18169153.6-1202, 6 pages.
European Examination Report dated Jan. 27, 2020 issued in counterpart application No. 13174342.9-1202, 6 pages.
European Search Report dated Nov. 18, 2015 issued in counterpart application No. 13174342.9-1804, 7 pages.

* cited by examiner

WIRELESS CHARGING APPARATUS AND PORTABLE TERMINAL INCLUDING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY

This application claims priority under 35 U.S.C. §119(a) to Korean Application Serial No. 10-2012-0070242 which was filed in the Korean Intellectual Property Office on Jun. 28, 2012, the entire content of which is incorporated herein by reference.

BACKGROUND OF THE INVENTION

1. Field of the Invention

The present invention generally relates to a wireless charging apparatus and a portable terminal including the same.

2. Description of the Related Art

In general, portable electronic devices include portable terminals, MP3 players, portable multimedia players (PMPs), and electronic books, and refer to devices by which users can access various contents while carrying them. In particular, various functions have recently been integrated in portable terminals, specifically, smart phones. The portable terminals have a near field communication (NFC) function for payment or user verification through security cards for verifying incoming and outgoing people, traffic cards, credit cards, and the like. Such a portable terminal includes a separate antenna to perform the NFC function such as that described in Korean Patent Publication No. 2009-126323 (published on Dec. 8, 2009).

The portable terminal includes a detachable or embedded battery to supply electric power to the portable terminal. A user can charge the battery according to a battery level of the battery. Charging of batteries may be generally classified into wired charging and wireless charging. Wired charging is generally widely distributed, but various technologies for wireless charging are currently being developed. The wireless charging technologies include an inductive coupling type using magnetic fields, a capacitive coupling type using electric fields, and a radio frequency radiation method. The inductive coupling type is suitable for wireless charging in the aspect of power efficiency. In the inductive coupling type wireless charging, a primary coil provided in a charger and a secondary coil provided in a terminal are arranged such that the terminal can be charged. Such wireless charging technology is disclosed in Korean Patent Publication No. 2008-32519 (published on Apr. 15, 2008) and the like.

FIG. 1 is a view schematically illustrating a wireless charging apparatus mounted to a terminal for wireless charging according to the prior art. FIG. 2 is a view schematically illustrating the rear side of a shield member to which a secondary coil is mounted and a driving circuit unit according to the prior art. Referring to FIGS. 1 and 2, an NFC antenna element substantially in the form of a loop antenna and a secondary coil for wireless charging are mounted to one terminal to provide the terminal with the NFC function and the wireless charging function. The driving circuit unit connected to the NFC antenna element and the secondary coil for wireless charging is provided at one side of an upper end thereof. The shield member is used to interrupt the antenna element and the secondary coil from interfering with each other and to prevent an operation of the secondary coil from influencing the other circuit units in the terminal when the antenna element and the secondary coil are operated, respectively.

In the case of the wireless charging apparatus, heat is generated in the driving circuit unit during charging. FIG. 3 is a view obtained by measuring a temperature distribution of heat generated after wireless charging according to the prior art. Referring to FIG. 3, since the heat generated by the driving circuit unit cannot be dispersed to the outside, heat is concentrated only at a local portion such as a hotspot to be emitted. Since an antenna for communications of the portable terminal, a loop antenna, and an NFC antenna element are provided at a peripheral portion of the heated driving circuit unit, they are influenced by the generated heat, and since the generated heat cannot be dispersed, the performance of the driving circuit unit deteriorates due to the heat.

A material such as graphite may be applied to the driving circuit unit to disperse the emitted heat, but, as a result, the NFC antenna element may deteriorate or the wireless charging efficiency may be lowered, causing various problems such as a charging defect. Further, the wireless charging apparatus has many restrictions in realizing a heat dispersing structure at points other than the driving circuit unit due to mounting of the antennas.

SUMMARY OF THE INVENTION

The present invention has been made to address at least the problems and disadvantages described above, and to provide at least the advantages described below. Accordingly, aspects of the present invention provide a wireless charging apparatus which can be installed within a limited space and can disperse heat locally generated in the wireless charging apparatus during wireless charging, and a portable terminal.

In accordance with an aspect of the present invention, there is provided a wireless charging apparatus provided in an electronic device, the wireless charging apparatus including a charging resonance unit for wireless charging; a driving circuit unit to which the charging resonance unit is connected and to which an internal circuitry is mounted; a shield member mounted to a rear surface of the charging resonance unit; and a heat dispersion member mounted to the driving circuit unit and the shield member to disperse heat generated by the driving circuit unit.

In accordance with another aspect of the present invention, there is provided a portable terminal including a wireless charging module provided in a body of the portable terminal to be wirelessly charged by an external charging pad; and a dispersion module provided in the wireless charging module to disperse heat generated by the wireless charging module during charging.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
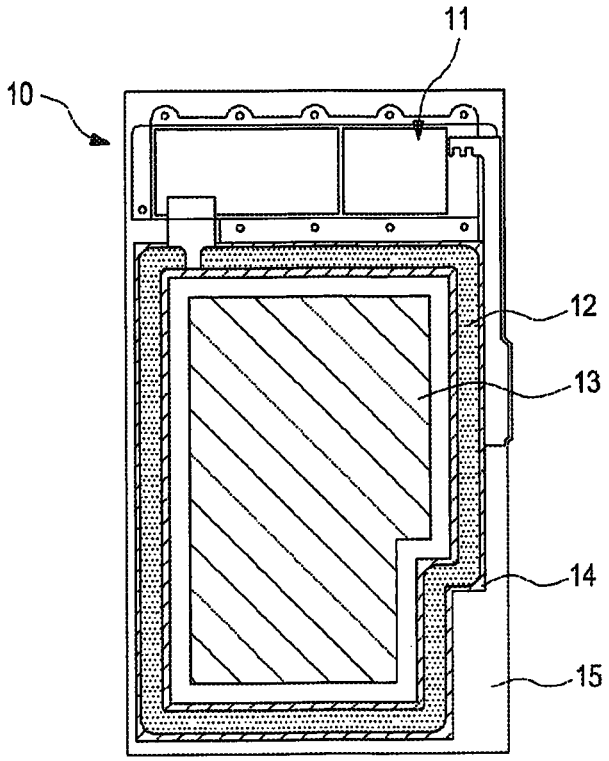
FIG.1 (PRIOR ART)
FIG. 1 is a view schematically illustrating a wireless charging module mounted to a portable terminal for wireless charging according to the prior art.
Figure 2:
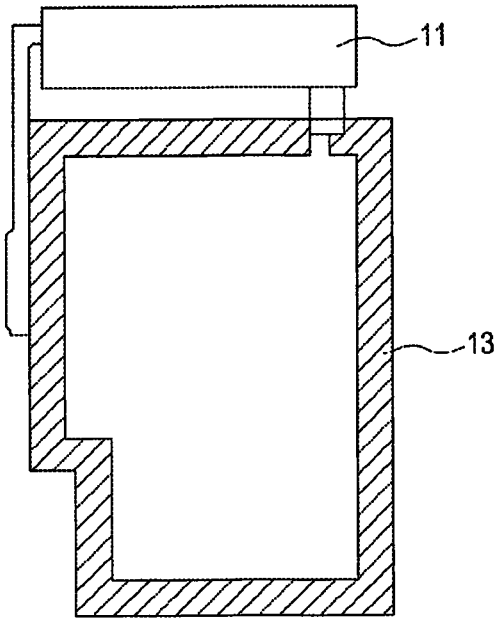
FIG.2 (PRIOR ART)
FIG. 2 is a view schematically illustrating a rear side of a shield member to which a secondary coil is mounted and an internal circuitry of FIG. 1 according to the prior art.

Hereinafter, various embodiments of the present invention will be described with reference to the accompanying drawings. In the following description of the present invention, a detailed description of known functions and configurations incorporated herein will be omitted when it may obscure the subject matter of the present invention.

Thicknesses of lines shown in the drawings and sizes of constituent elements may be exaggerated for clarity and convenience. Further, the following terms are defined, considering their functions in the present invention, and may be varied according to intentions and customs of a user or manager. Thus, the terms should be defined in the context of the entire specification. Further, although ordinal numbers such as first and second are used in the description of the embodiments of the present invention, their sequence is interchangeable.

An aspect of the present invention provides an integral dispersion module 102 configured such that heat generated by a driving circuit unit 110 can be dispersed to a rear surface of the driving circuit unit 110 and a rear surface of a charging resonance unit 120 during wireless charging, to prevent generation of a hot spot section (i.e., a section where generated heat is intensively concentrated). Further, the present invention prevents heat from being locally concentrated to improve the reliability of the driving circuit unit 110 experiencing heating and prevents lowering of the efficiency of the wireless charging resonance unit 120 due to the generated heat during wireless charging as well.

The wireless charging apparatus and the portable terminal including the same according to the present invention will be described with reference to FIGS. 4 to 8.

Figure 4:
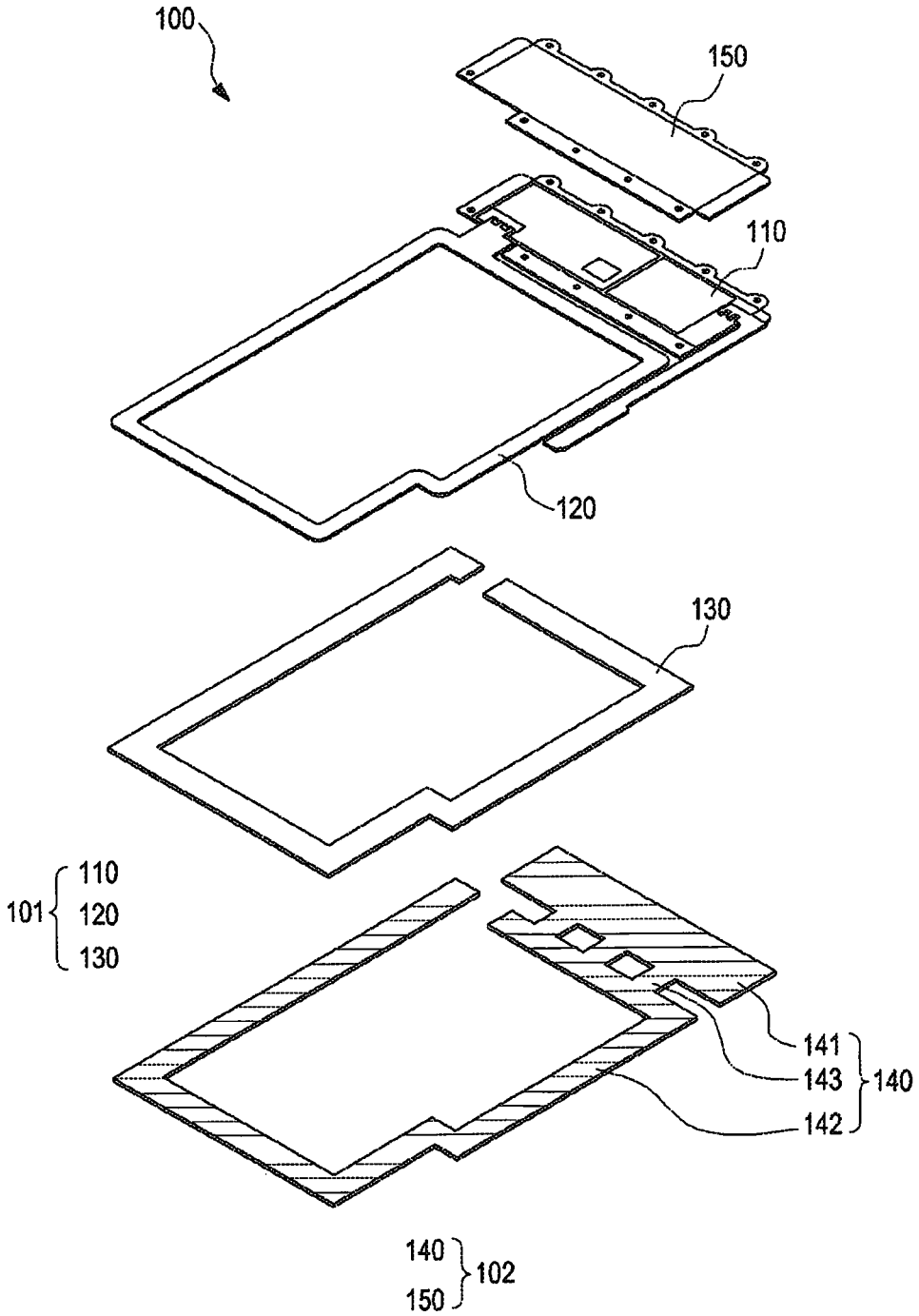
FIG. 4 is a view schematically illustrating a wireless charging apparatus according to an embodiment of the present invention.
Figure 5:
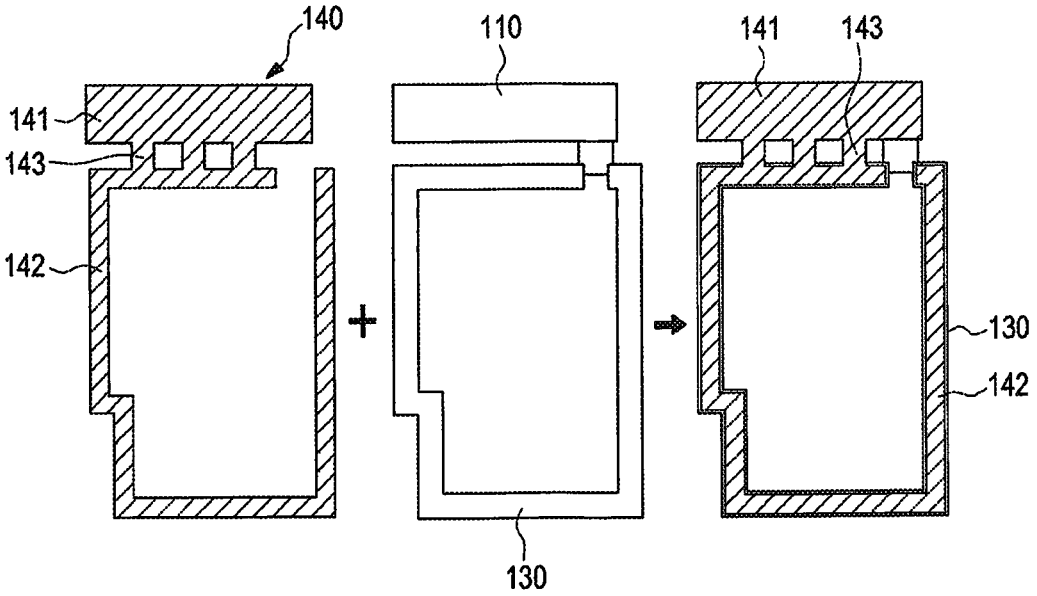
FIG. 5 is a view illustrating a rear surface of a heat dispersion member, rear surfaces of a driving circuit unit and a shield member connected thereto, and a rear surface of an assembly thereof.

FIG. 4 is a view schematically illustrating a wireless charging apparatus according to an embodiment of the present invention. FIG. 5 is a view illustrating a rear surface of a heat dispersion member, a rear surface of a driving circuit unit and a shield member connected thereto, and a rear surface of an assembly thereof. Referring to FIGS. 4 and 5, the wireless charging apparatus 100 is provided in an electronic device. For example, the electronic device of the present invention may include a portable terminal. The wireless charging apparatus 100 is provided inside the body (not shown) of the portable terminal, specifically, at a rear surface of the body where a battery (not shown) is provided, and is positioned on an external charging pad (not shown) to wirelessly charge the battery. Although not illustrated, the external charging pad is provided with a coil unit (not shown) that cooperates with the charging resonance unit 120 of the wireless charging apparatus 100. If the portable terminal provided with the wireless charging apparatus 100 is positioned on the external charging pad, the battery is charged by electromagnetic fields generated between the coil unit of the external charging pad and the charging resonance unit 120 of the wireless charging apparatus 100. Accordingly, the wireless charging apparatus 100 is provided with a wireless charging module 101, which would face the external charging pad to wirelessly charge the battery, and a dispersion module 102, which is provided to the wireless charging module 101 to disperse heat generated by the wireless charging module 101 during charging. Specifically, heat generated by a driving circuit unit 110, which will be described below, is dispersed through a heat emission plate 150, located on the driving circuit unit 110 and a heat dispersion module 102 integrally extending from the rear surfaces of the driving circuit unit 110 and the shield member 130.

Figure 6:
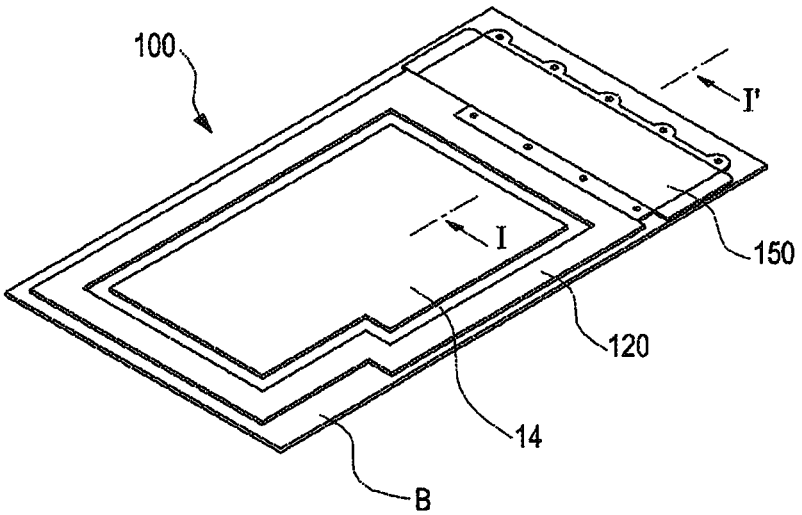
FIG. 6 is a view schematically illustrating the wireless charging apparatus of FIG. 4 to which a dispersion module is mounted.
Figure 7:
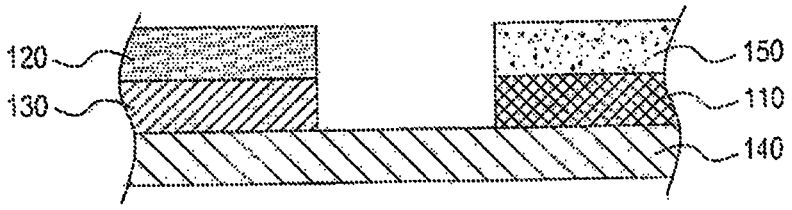
FIG. 7 is a schematic sectional view taken along line I-I' of FIG. 6.

FIG. 6 is a view schematically illustrating the wireless charging apparatus of FIG. 4 to which a dispersion module is mounted. FIG. 7 is a schematic sectional view taken along line I-I' of FIG. 6. Referring to FIGS. 6 and 7, the wireless charging module 101 is provided on a bracket B to which an NFC module 14 is mounted. The wireless charging module 101 includes a charging resonance unit 120 cooperating with a coil unit, a driving circuit unit 110, and a shield unit 130. The dispersion module 102 is provided to the wireless charging module 100. The charging resonance unit 120 cooperates with the coil unit of the charging pad to wirelessly charge the battery as an induced electromotive force is generated. The charging resonance unit 120 is electrically connected to the driving circuit unit 110, and is mounted on the shield member 130. That is, the shield member 130 is provided on the rear surface of the charging resonance unit 120, and prevents the coil unit, the charging resonance unit 120, and the NFC module 14 from interfering with each other, or influencing the circuit units embedded in the terminal due to: 1) high frequency waves and low frequency waves transmitted through the coil unit, the charging resonance unit 120, and the NFC module 14, or 2) electromagnetic waves generated by electric power. The charging resonance unit 120 is mounted around the NFC module 14. The driving circuit unit 110 is mounted to one side of the charging resonance unit 120, and the charging resonance unit 120 is connected to the driving circuit unit 110. When mounted on the bracket B, the driving circuit unit 110 is located on an upper surface of the bracket B and the shield member 130, to which the charging resonance unit 120 is mounted, is provided on a lower surface of the bracket B on a lower side of the driving circuit unit 110.

When the wireless charging module 100 cooperates with the external charging pad to wirelessly charge the battery, heat is generated by the driving circuit unit 110. The dispersion module 102 is provided in the wireless charging module 100 to disperse the heat. The dispersion module 102 includes the heat emission plate 150 and a heat dispersion member 140. The heat emission plate 150 is located at an upper end of the driving circuit unit 110. The heat emission plate covers the driving circuit unit 110 and receives and disperses the heat generated by the driving circuit unit 110. The heat emission plate 150 is preferably a metal plate formed of a steel use stainless (SUS) material. The heat emission plate 150 is connected to the heat dispersion member 140, which will be described below, in detail. The heat dispersion member includes a first dispersion sheet 141, which disperses the heat generated by the driving circuit unit 110 to the outside, and the heat emission plate 150 transfers the heat of the driving circuit unit 110 to the first dispersion sheet 141 to disperse the heat. The heat dispersion member 140 is disposed at a lower end of the driving circuit unit 110 to be connected to the heat emission plate 150, and extends from a lower end surface of the driving circuit unit 110 to a lower end surface of the shield member 130. Specifically, the heat dispersion member 140 has a shape similar to the shape of the driving circuit unit 110 and the shape of the shield member 130 so that it may be mounted on the rear surface of the driving circuit unit 110 and the rear surface of the shield member 130. Thus, the heat dispersion member 140, the driving circuit unit 110, and the shield member 130 are integrally connected to each other. Accordingly, the heat dispersion member 140 on a side of the driving circuit unit 110 receives heat of the heat emission plate 150 to transfer and disperse the heat to the rear surface of the driving circuit unit 110 and the rear surface of the shield member 130.

The heat dispersion member 140 is may be formed of a copper material having a high thermal conductivity to maximize heat transfer and dispersion. However, the present invention is not limited thereto. The heat dispersion member 140 may, for example, instead be formed of a metal such as aluminum or steel, or a highly conductive material such as graphite. The heat dispersion member 140 is located between the bracket B and the wireless charging module 100. The heat dispersion member 140 includes the first dispersion sheet 141, a second dispersion sheet 142, and a plurality of connection passages 143. The first dispersion sheet 141 is provided on the rear surface of the driving circuit unit 110. The driving circuit unit 110 and the heat emission plate 150 are located on the upper surface of the first dispersion sheet 141. The shield member 130 is located on the upper surface of the second dispersion sheet 142 by mounting the second dispersion sheet 142 on the rear surface of the shield member 130. The first dispersion sheet 141 and the second dispersion sheet 142 are integrally connected to each other via the plurality of connection passages 143. The heat provided to the first dispersion sheet 141 may be transferred to the second dispersion sheet 142. Three connection passages 143 are exemplified in the present embodiment, which form movement paths along which the heat transferred to the first dispersion sheet 141 is moved to the second dispersion sheet 142.

Thus, when the electronic device having the wireless charging apparatus 100 (i.e., the portable terminal) is positioned on the external charging pad to be wirelessly charged, the battery is charged by the wireless charging module 101. Then, the heat that is generated by the driving circuit unit 110 is transferred to the heat emission plate 150 to be primarily dispersed. Further, the heat of the heat emission plate 150 is transferred to the first dispersion sheet 141, which is connected to the heat emission plate 150 and has a high thermal conductivity. As the heat is transferred to the first dispersion sheet 141, a temperature of the heat emission plate 150 is decreased. The heat of the first dispersion sheet 141 is transferred to the second dispersion sheet 142 through the connection passages 143. Accordingly, the temperature of the first dispersion sheet 141 is decreased. Thus, as the heat generated by the driving circuit unit 110 is transferred from the heat emission plate 150 to the first dispersion sheet 141, the connection passages 143, and the second dispersion sheet 142 to be dispersed, a temperature of the hot spot portion due to the heat generated by the driving circuit unit 110 is decreased.

Figure 3:
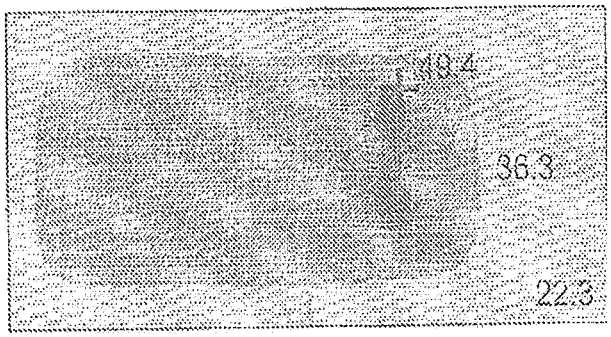
FIG.3 (PRIOR ART)
FIG. 3 is a view illustrating a distribution of heat generated after a portable terminal, to which the wireless charging module according to the prior art is provided, is wirelessly charged.
Figure 8:
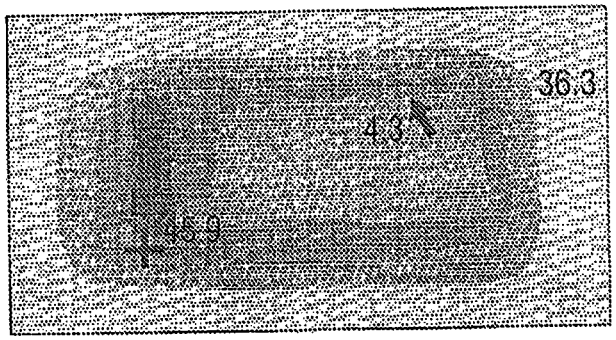
FIG. 8 is a view illustrating a temperature distribution after a portable terminal having the wireless charging apparatus according to an embodiment of the present invention is charged.

FIG. 8 is a view illustrating a temperature distribution after a portable terminal having the wireless charging apparatus according to the embodiment of the present invention is charged. Referring to FIG. 8, when a temperature distribution of a hot spot portion (i.e., the driving circuit unit 110) according to wireless charging according to the prior art is compared with a temperature distribution of the hot spot portion in the state in which the dispersion module 102 according to the present embodiment is provided, it can be seen that the temperature is decreased by 3 to 4 degrees (based on a comparison of FIG. 3 and FIG. 8). That is, since the heat generated by the conventional driving circuit unit is dispersed only onto the driving circuit unit, the maximum temperature measured at the hot spot portion is about 49.4 degrees (see FIG. 3). In contrast, according to the present embodiment, since the heat generated by the driving circuit unit 110 is dispersed to the heat emission plate 150, and the first and second dispersion sheets 141 and 142, the maximum temperature measured at the hot spot portion is about 46.9 degrees, which shows that the temperature is decreased. Thus, as the heat at the hot spot portion is dispersed, a deformation of an internal structure due to high temperature can be prevented, making it possible to improve the reliability of the portable terminal. Furthermore, when the antenna for data or communications, the NFC module 14, or the charging resonance unit 120 is formed adjacent to the internal structure, their efficiencies can be improved due to heat emission of the internal structure.

According to the above-described wireless charging apparatus, heat generated by the driving circuit unit during wireless charging can be primarily dispersed through the heat emission plate, and the heat of the heat emission plate can be transferred to the heat dispersion member to secondarily disperse the heat.

Furthermore, since the heat transferred to the heat emission plate and the heat dispersion member (i.e. the heat transferred to the first dispersion sheet is dispersed through the rear surface of the driving circuit unit, and the heat transferred from the first dispersion sheet to the second dispersion sheet is dispersed through the rear surface of the shield member), the heat is transferred and dispersed to a lower section of the shield member so that a temperature increases at the hot spot portion locally generated on the driving circuit unit can be prevented and the temperature of the driving circuit unit can be decreased. That is, since the heat concentrated at the installation location of the driving circuit unit is dispersed on the driving circuit unit and the shield member, deviations of high temperature can be lowered, and accordingly, the performances of the antenna and the NFC module of the portable terminal and radiation performance in wireless charging are not influenced by the heat, and the heat generated in the internal circuitry can be dispersed.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A wireless charging apparatus provided in an electronic device, the wireless charging apparatus comprising:

*a battery;* a [charging] *resonance* unit for [wireless] charging *the battery based on electromagnetic fields generated by an external charging pad*;

*a shield member, wherein the resonance unit is mounted on an upper surface of the shield member;* a driving circuit unit to which the [charging] *resonance* unit is *electrically* connected [and to which an internal circuitry is mounted];

a [shield member mounted to a rear surface of the charging] *metal plate covering the driving circuit* unit; and a heat dispersion member[, mounted to at least one of a rear surface of the driving circuit unit and a rear surface of the shield member, to disperse heat generated by the driving circuit unit] *for dispersing heat*, wherein the heat dispersion member comprises:

a first dispersion sheet [mounted] *connected* to [the rear] *a lower* surface of the driving circuit unit and [connected to the heat emission plate so that the heat of the heat emission plate is transferred to the first dispersion sheet] *the metal plate*;

a second dispersion sheet [mounted] *connected* to [the rear] *a lower* surface of the shield member; and a plurality of connection passages connecting the first dispersion sheet and the second dispersion sheet,

*wherein heat disperses from the first dispersion sheet to the second dispersion sheet or from the second dispersion sheet to the first dispersion sheet, and*

*wherein the first dispersion sheet is located under the driving circuit unit, and the second dispersion sheet is coplanar with the first dispersion sheet.*

2. The wireless charging apparatus of claim 1, wherein [a heat emission] *the metal* plate for [covering the driving circuit unit and] dispersing the heat generated by the driving circuit unit is located on an upper surface of the driving circuit unit.

3. The wireless charging apparatus of claim 1, wherein the first dispersion sheet, the plurality of connection passages, and the second dispersion sheet are integrally formed.

4. The wireless charging apparatus of claim 1, wherein the [heat emission] *metal* plate is connected to the first dispersion sheet along a periphery of an upper surface of the first dispersion sheet so that the heat dispersed to the [heat emission] *metal* plate is transferred to the first dispersion sheet.

5. The wireless charging apparatus of claim 4, wherein the heat dispersion member is formed of a copper material.

6. The wireless charging apparatus of claim 4, wherein during wireless charging, the heat generated by the driving circuit unit is dispersed through the [heat emission] *metal* plate and is dispersed to the first dispersion sheet connected to the [heat emission] *metal* plate, and the heat transferred to the first dispersion sheet is dispersed to the second dispersion sheet through the plurality of connection passages.

*7. An electronic device, comprising:*

*a power receiving circuit configured to wirelessly receive power from an external wireless charging apparatus;*

*a shield member, wherein the power receiving circuit is mounted on an upper surface of the shield member;*

*a driving circuit unit electrically connected to the power receiving circuit and including internal circuitry for charging a battery of the electronic device;*

*a plate receiving heat from the driving circuit unit and covering the driving circuit unit; and*

*a heat dispersion sheet configured to disperse heat from at least one of the plate and the shield member,*

*wherein the heat dispersion sheet comprises:*

*a first dispersion portion connected to a lower surface of the driving circuit unit and the plate; and*

*a second dispersion portion connected to a lower surface of the shield member,*

*wherein the first dispersion portion extends to the second dispersion portion via a plurality of connection passages,*

*wherein heat disperses from the first dispersion portion to the second dispersion portion or from the second dispersion portion to the first dispersion portion, and*

*wherein the first dispersion sheet is located under the driving circuit, and the second dispersion sheet is coplanar with the first dispersion sheet.*

*8. The electronic device of claim 7, wherein the power receiving circuit comprises a wireless power receiving antenna.*

*9. The electronic device of claim 7, wherein a shape of the heat dispersion sheet corresponds to a shape of the shield member.*

*10. The electronic device of claim 7, wherein the heat dispersion sheet comprises a copper sheet.*

*11. An electronic device, comprising:*

*a power receiving circuit configured to wirelessly receive power from an external wireless charging apparatus;*

*a shield member, wherein the power receiving circuit is mounted to on an upper surface of the shield member;*

*a driving circuit unit electrically connected to the power receiving circuit and comprising an internal circuitry for charging a battery of the electronic device;*

*a plate receiving heat from the driving circuit unit and covering the driving circuit unit; and*

*a heat dispersion sheet configured to disperse heat from at least one of the plate and the shield member,*

*wherein the heat dispersion sheet covers at least part of the shield member and at least part of the plate,*

*wherein the heat dispersion sheet comprises:*

*a first dispersion portion connected to a lower surface of the driving circuit unit and the plate,*

*a second dispersion portion connected to a lower surface of the shield member, and*

*a plurality of connection passages connecting the first dispersion sheet and the second dispersion sheet,*

*wherein heat disperses from the first dispersion portion to the second dispersion portion or from the second dispersion portion to the first dispersion portion, and*

*wherein the first dispersion sheet is located under the driving circuit unit, and the second dispersion sheet is coplanar with the first dispersion sheet.*

*12. The electronic device of claim 11, wherein the power receiving circuit comprises a wireless power receiving antenna.*

*13. The electronic device of claim 11, wherein the heat dispersion sheet comprises a copper sheet.*

* * * * *